United States Patent
Song (10) Patent No.: US 7,394,623 B2
(45) Date of Patent: Jul. 1, 2008

(54) AIR BEARING SLIDER FOR DISK DRIVE AND SUSPENSION ASSEMBLY INCLUDING THE AIR BEARING SLIDER

(75) Inventor: Seung-hyun Song, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 422 days.

(21) Appl. No.: 11/066,271

(22) Filed: Feb. 28, 2005

(65) Prior Publication Data

US 2005/0190500 A1    Sep. 1, 2005

(30) Foreign Application Priority Data

Feb. 27, 2004    (KR) ...................... 10-2004-0013579

(51) Int. Cl.
*G11B 17/32* (2006.01)
(52) U.S. Cl. .................................. 360/235.5
(58) Field of Classification Search ............. 360/235.5, 360/235.6, 235.4
See application file for complete search history.

(56) References Cited

U.S. PATENT DOCUMENTS

| 4,814,906 A | * | 3/1989 | Suzuki et al. .................. 360/75 |
| 5,276,573 A | * | 1/1994 | Harada et al. ............. 360/235.3 |
| 5,354,133 A | * | 10/1994 | Rapparini .................... 383/103 |
| 6,344,949 B1 | * | 2/2002 | Albrecht et al. ........... 360/236.5 |
| 6,445,541 B1 | * | 9/2002 | Boutaghou et al. ........ 360/235.5 |
| 6,985,333 B1 | * | 1/2006 | Hiller et al. ................ 360/235.5 |

FOREIGN PATENT DOCUMENTS

| JP | 63-13180 | | 1/1988 |
| JP | 63-96783 | | 4/1988 |
| JP | 63-161514 | | 7/1988 |
| JP | 63-224087 | * | 9/1988 |
| JP | 1-149211 | | 6/1989 |
| JP | 1-211234 | | 8/1989 |
| JP | 3-41679 | | 2/1991 |
| KR | 93-009999 | | 10/1993 |
| KR | 2002-0003902 | | 1/2002 |

OTHER PUBLICATIONS

Notice to Submit Response issued by the Korean Intellectual Property Office in Application No. 10-2004-0013579 dated Oct. 28, 2005.

* cited by examiner

*Primary Examiner*—Allen Cao
(74) *Attorney, Agent, or Firm*—Staas & Halsey LLP

(57) ABSTRACT

An air bearing slider for a disk drive, which has a read/write head mounted thereon and is lifted from a surface of a disk due to a lifting force generated by the rotation of the disk, and a suspension assembly including the air bearing slider, the air bearing slide includes: a slider body, which has a disk facing surface facing the surface of the disk and a rear surface opposite to the disk facing surface; a positive pressure forming rail part, which protrudes from the disk facing surface of the slider body and generates a positive pressure for lifting the slider body from the surface of the disk; and an air ventilator, which passes obliquely through the slider body from the disk facing surface to the rear surface in an air flow direction and discharges air introduced between the disk and the slider body and particles contained in the air.

29 Claims, 9 Drawing Sheets
(4 of 9 Drawing Sheet(s) Filed in Color)

FIG. 10A $\theta_1 = 50°, \theta_2 = 47°$

FIG. 10B $\theta_1 = 50°, \theta_2 = 53°$

AIR BEARING SLIDER FOR DISK DRIVE AND SUSPENSION ASSEMBLY INCLUDING THE AIR BEARING SLIDER

CROSS-REFERENCE TO RELATED APPLICATION

This application claims the priority of Korean Patent Application No. 2004-13579, filed on Feb. 27, 2004, in the Korean Intellectual Property Office, the disclosure of which is incorporated herein in its entirety by reference.

BACKGROUND OF THE INVENTION

1. Field of the Invention

The present invention relates to a disk drive, and more particularly, to an air bearing slider, which has a read/write head mounted thereon and is lifted from a surface of a disk due to a lifting force generated by the rotation of the disk, and a suspension assembly including the air bearing slider.

2. Description of the Related Art

Hard Disk Drives (HDDs) that can store information in computers read data written on disks or write data on the disks using read/write heads.

Figure 1A:
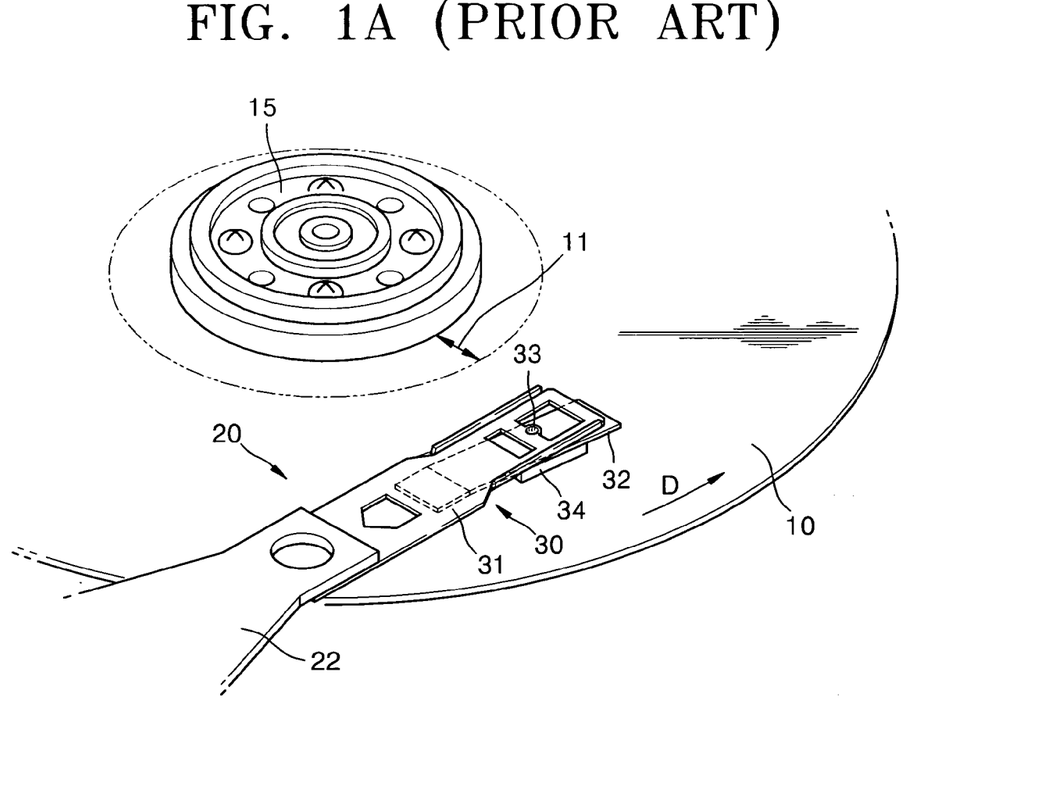
FIGS. 1A and 1B are respectively a partial perspective view and a partial side view of a conventional hard disk drive.
Figure 1B:
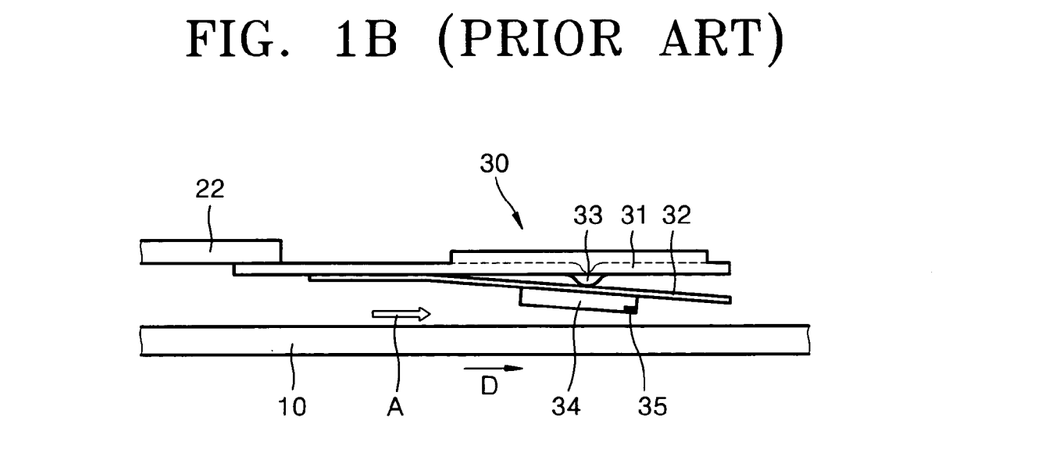

FIGS. 1A and 1B are respectively a partial perspective view and a partial side view of a conventional HDD.

Referring to FIGS. 1A and 1B, an HDD includes a disk 10 on which data is written, a spindle motor 15, which rotates the disk 10, and an actuator 20, which moves a read/write head 35 for writing data on the disk 10 or reading data written on the disk 10 to a desired position on the disk 10.

The actuator 20 includes a swing arm 22, which is rotated by a voice coil motor (VCM, not shown), and a suspension assembly 30, which is installed at one end portion of the swing arm 22 and elastically biases an air bearing slider 34, on which the read/write head 35 is mounted, toward a surface of the disk 10.

The suspension assembly 30 includes a load beam 31, which is coupled to the one end portion of the swing arm 22, and a flexure 32, which supports the air bearing slider 34 on which the read/write head 35 is mounted. The air bearing slider 34 with the read/write head 35 thereon is lifted to a predetermined height from the surface of the disk 10 due to a lifting force generated by the rotation of the disk 10, and maintains a predetermined distance between the read/write head 35 and the disk 10. A rear end portion of the flexure 32 is fixed to a surface of the load beam 31, that is, a surface facing the disk 10, by welding or the like, and a front end portion of the flexure 32 moves freely. A dimple 33 is formed on the load beam 31 in such a manner as to protrude toward the flexure 32. A predetermined elastic force is provided to the flexure 32 due to the dimple 33. In the above structure, the flexure 32 can move freely, thereby allowing the air bearing slider 34 attached to the flexure 32 to roll and pitch smoothly.

When the HDD does not operate, that is, when the disk 10 stops rotating, the air bearing slider 34 is parked on a parking zone 11 formed on an inner peripheral side of the disk 10 due to the elastic force of the suspension assembly 30. This head parking method is referred to as a contact start stop (CSS) method.

Further, a ramp loading method may be used instead of the CSS method. In the ramp loading method, a ramp is installed outside the disk and the read/write head is parked on the ramp.

When the HDD is turned on and the disk 10 begins to rotate in a direction D, air starts flowing in a direction A. A lifting force generated due to the air flow is applied to a bottom surface of the air bearing slider 34, that is, an air bearing surface, and thus, the air bearing slider 34 is lifted. At this time, the air bearing slider 34 is lifted up to a height where the lifting force generated by the rotation of the disk 10 becomes equal to the elastic force of the suspension assembly 30. The lifted air bearing slider 34 is moved to a desired position over the disk 10 as the swing arm 22 rotates, and the read/write head 35 mounted on the air bearing slider 34 maintains a predetermined distance from the rotating disk 10 and writes or reads data to or from the disk 10.

The air bearing slider 34 performing the aforesaid function may have various structures. For example, FIG. 2 is a perspective view illustrating a basic structure of a conventional taper flat (TF) air bearing slider.

Figure 2:
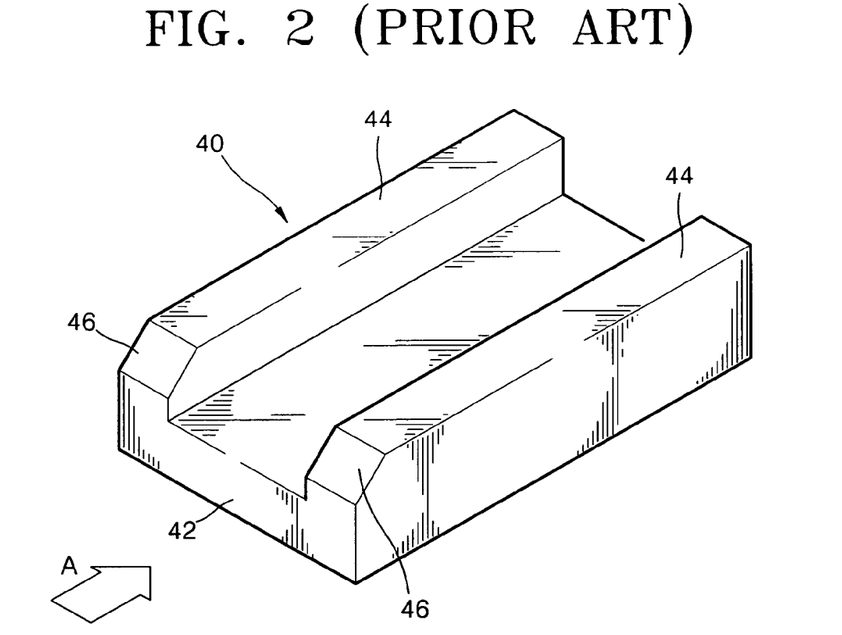
FIG. 2 is a schematic perspective view illustrating a basic structure of a conventional taper flat air bearing slider.

Referring to FIG. 2, a TF air bearing slider 40 has a thin hexahedral body 42. Two rails 44 extending in a longitudinal direction of the body 42 protrude to a predetermined height from a surface of the body 42, that is, a surface facing the disk 10. Inclined surfaces 46 are formed respectively at front end portions of the two rails 44. In the above structure, if air flows in a direction A due to the rotation of the disk 10, air is compressed at the inclined surfaces 46 such that a positive pressure is applied to surfaces of the two rails 44. A lifting force for lifting the air bearing slider 40 from the surface of the disk 10 is generated due to the positive pressure.

Here, the TF air bearing slider 40 has a problem in that as the number of revolutions per minute (RPM) of the disk 10 increases, the lifting force and the flying height continue to increase. The RPM and the flying height are substantially linearly proportional to each other.

Figure 3:
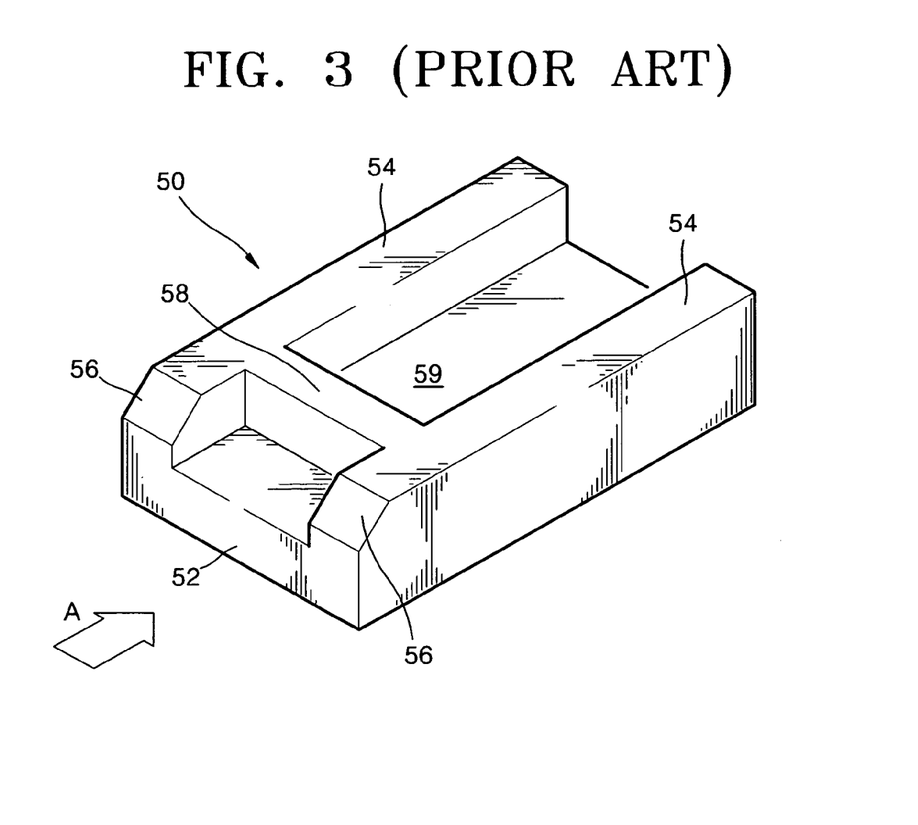
FIG. 3 is a schematic perspective view illustrating a basic structure of a conventional negative pressure air bearing slider.

Accordingly, in recent years, a negative pressure (NP) air bearing slider that allows the read/write head to fly at a more consistent flying height over the disk by generating a negative pressure as well as a positive pressure is increasingly popular. FIG. 3 is a perspective view illustrating a basic structure of a conventional NP air bearing slider.

Referring to FIG. 3, an NP air bearing slider 50 includes a body 52, two rails 54, which protrude from a surface of the body 52, that is, a surface facing the disk 10 and extend in a longitudinal direction of the body 52, and a cross rail 58, which is interposed between the two rails 54 and extends widthwise over the body 52. Inclined surfaces 56 are formed at front end portions of the two rails 54, and the cross rail 58 has the same height as the two rails 54. In the above structure, if air flows in a direction A due to the rotation of the disk 10, the two rails 54 generate a positive pressure at both sides of the body 52, and the cross rail 58 forms a negative pressure cavity 59 at a central portion of the body 52. Since the positive pressure is higher than the negative pressure at an earlier stage of the rotation of the disk 10, the air bearing slider 50 is lifted. If the rotational speed of the disk 10 increases, the negative pressure increases. If the rotational speed of the disk 10 reaches a predetermined RPM, the positive pressure and the negative pressure become equal to each other such that the air bearing slider 50 is no longer lifted and is maintained at a constant flying height.

Particles exist in the HDD constructed as described above. The particles attached to the surface of the disk 10 and/or contained in air inside the HDD are conveyed along with the air. When these particles are introduced between the disk 10 and the air bearing slider 34, the particles may cause a scratch or thermal asperity (TA) on the surface of the disk 10, or a damage to the read/write head 35 mounted on the air bearing slider 34, thereby deteriorating the function of the read/write head 35.

To solve the above problem, efforts have been made to improve the cleanliness of the air bearing slider 34, reprocess edges of the air bearing slider 34 to remove chips, maintain a proper flying height of the air bearing slider 34, and/or design the slider 34 so that particles can flow outwardly. Efforts have also been made to improve the cleanliness of a clean room, install a filter for filtering particles inside the HDD, and/or additionally apply a structure for removing particles stuck to the surface of the disk 10 to the HDD.

Nevertheless, the result of those efforts falls short of expectations. Moreover, when the design of the HDD is changed or a new component is added to the HDD, the possibility of problems caused due to the particles is further raised. In particular, the flying height of the air bearing slider 34 is recently decreasing to improve the function of the read/write head 35. Accordingly, the problems due to the particles are becoming more severe.

SUMMARY OF THE INVENTION

The invention provides an air bearing slider for a disk drive, which can minimize problems caused due to particles by discharging particles introduced between a surface of a disk and the air bearing slider to the outside of the air bearing slider through an air ventilation formed in the air bearing slider, and a suspension assembly including the air bearing slider.

According to an aspect of the invention, there is an air bearing slider for a disk drive, which has a read/write head mounted thereon and is lifted from a surface of a disk due to a lifting force generated by the rotation of the disk, the air bearing slider including: a slider body, which has a disk facing surface facing the surface of the disk and a rear surface opposite to the disk facing surface; a positive pressure forming rail part, which protrudes from the disk facing surface of the slider body and generates a positive pressure for lifting the slider body from the surface of the disk; and an air ventilation, which passes obliquely through the slider body from the disk facing surface to the rear surface in an air flow direction and discharges air introduced between the disk and the slider body and particles contained in the air.

According to another aspect of the invention, a negative pressure cavity is formed on the disk facing surface of the slider body, and the air ventilation is positioned in the negative pressure cavity.

According to another aspect of the invention, a cross-section of the air ventilation is one of circular, oval, and polygonal shapes.

According to another aspect of the invention, an inclination angle of the air ventilation relative to the disk facing surface of the slider body may range from approximately 30 to 60°.

According to another aspect of the invention, an inlet and an outlet of the air ventilation have areas different from each other, and in this case, the inlet of the air ventilation is an area larger than that of the outlet of the air ventilation.

According to another aspect of the invention, a width of the air ventilation is equal to approximately 1/10 to 1/2 of a width of the slider body.

According to another aspect of the invention, there is provided a suspension assembly of an actuator for a disk drive, which elastically biases a read/write head toward a surface of a disk, the suspension assembly including: a load beam, which is coupled to an end portion of a swing arm of the actuator; a flexure, which has one end portion fixed to a disk facing surface of the load beam and the other end portion extending along an end portion of the load beam; and an air bearing slider, which is attached to a disk facing surface of the flexure, has the read/write head mounted thereon, and is lifted from the surface of the disk due to a lifting force generated by the rotation of the disk, the air bearing slider comprising: a slider body, which has a disk facing surface and a rear surface opposite to the disk facing surface; a positive pressure generating rail part, which protrudes from the disk facing surface of the slider body and generates a positive pressure for lifting the slider body from the surface of the disk; and an air ventilation, which passes obliquely through the slider body from the disk facing surface to the rear surface in an air flow direction and discharges air introduced between the disk and the slider body and particles contained in the air.

According to another aspect of the invention, a hole is formed in the flexure to communicate with the air ventilation, and a filter is installed over the hole to filter the particles contained in the air discharged through the air ventilation.

According to another aspect of the invention, the hole has area larger than that of an outlet of the air ventilation.

According to another aspect of the invention, edges of the filter are attached around a periphery of the hole to cover the hole, and the filter may be a membrane filter with a thickness less than a distance between the flexure and the load beam.

Accordingly, since the air and airborne particles introduced between the surface of the disk and the air bearing slider are discharged through the air ventilation formed in the air bearing slider to the outside of the air bearing slider, a damage to the disk and the read/write head due to the particles is minimized.

Additional aspects and/or advantages of the invention will be set forth in part in the description which follows and, in part, will be obvious from the description, or may be learned by practice of the invention.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee. These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 4:
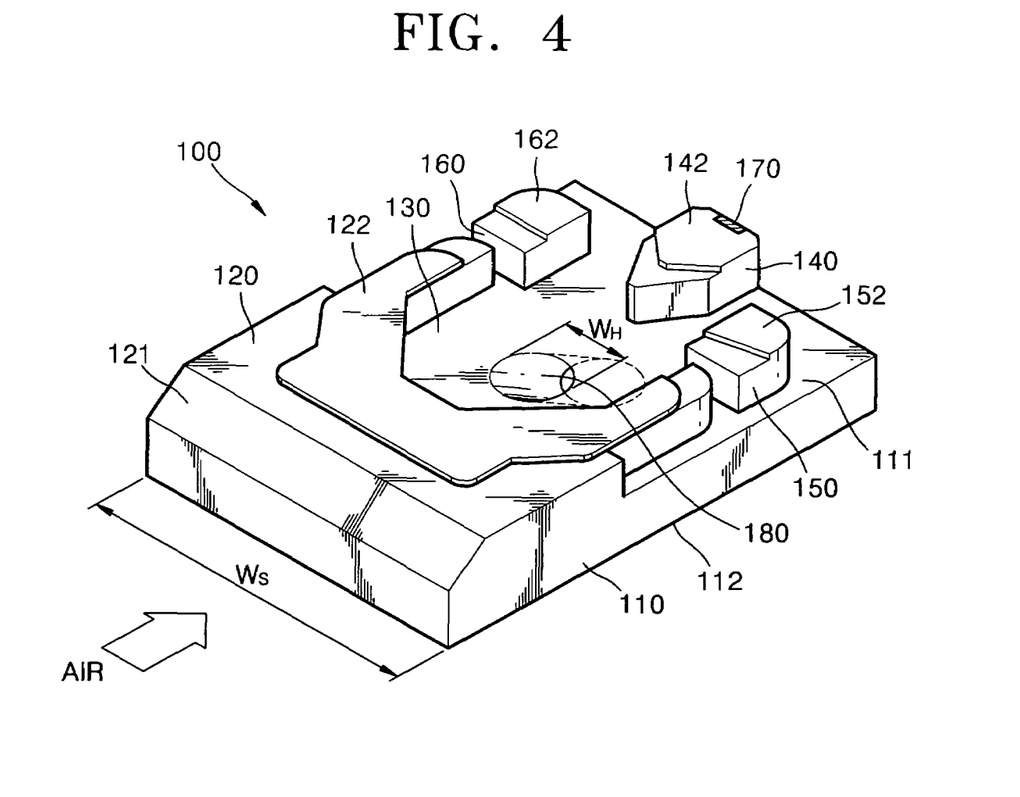
FIG. 4 is a perspective view of an air bearing slider according to an embodiment of the invention.
Figure 5:
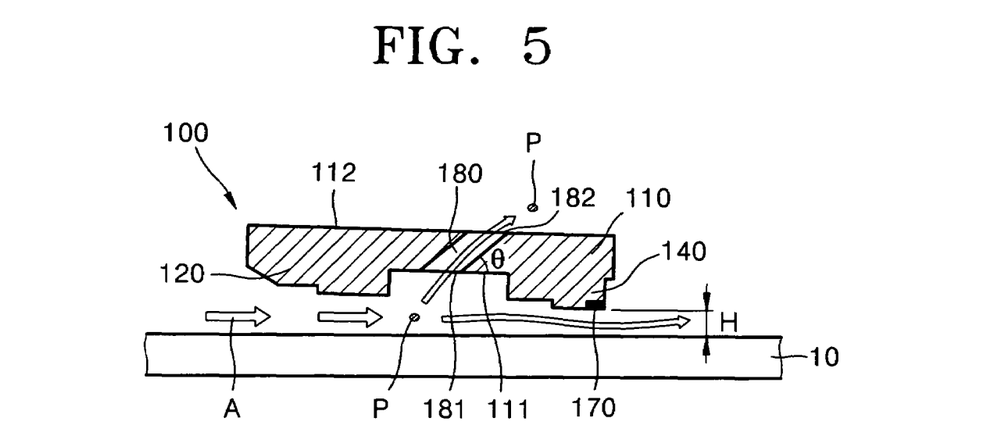
FIG. 5 is a vertical sectional view of the air bearing slider shown in FIG. 4.

FIG. 4 is a perspective view of an air bearing slider according to an aspect of the invention. FIG. 5 is a vertical sectional view of the air bearing slider of FIG. 4.

Referring to FIGS. 4 and 5, an air bearing slider 100 on which a read/write head 170 is mounted is lifted from a surface of a medium, such as a disk 10, due to a lifting force generated by the rotation of the disk 10. The air bearing slider 100 includes a slider body 110, a positive pressure forming rail part, and an air ventilator 180 to provide for air ventilation.

The slider body 110 is shaped to produce a positive pressure to create a lifting force according to the air flowing in the disk drive upon rotation of the disk 10. For example, the slider body 110 may have a thin hexahedral shape, and has a disk facing surface 111 facing a surface of the disk 10 and a rear surface 112 opposite to the disk facing surface 111.

The positive pressure forming rail part protrudes from the disk facing surface 111 of the slider body 110 and may have various shapes that can produce a positive pressure for lifting the slider body 110 from the surface of the disk 10. For example, the positive pressure forming rail part, as shown in FIG. 4, may include first and second rail bases 120 and 140, and first and second rails 122 and 142 respectively formed on or above top surfaces of the first and second rail bases 120 and 140.

The first rail base 120 protrudes to a predetermined height from the disk facing surface 111 of the slider body 110, and the rear end has an open area. For example, the rear end area has substantially U shaped and opened toward a rear end portion of the slider body 110. The first rail 122 formed on the top surface of the first rail base 120 is similarly shaped. For example, the first rail 122 is substantially U shaped, similar to the first rail base 120. The first rail 122 protrudes to a predetermined height from the top surface of the first rail base 120, and thus, a stepped portion is formed between a top surface of the first rail 122 and the top surface of the first rail base 120. An inclined surface 121 may be formed at a front end portion of the first rail base 120. The inclined surface 121 permits air to be more smoothly introduced between the disk 10 and the slider body 110, and compresses the introduced air.

The second rail base 140 is formed near the rear end portion of the slider body 110, and protrudes to a predetermined height from the disk facing surface 111 of the slider body 110. The second rail base 140 may have substantially the same height as the first rail base 120. The second rail 142 protrudes to a predetermined height from the top surface of the second rail base 140, and thus, a stepped portion is formed between a top surface of the second rail 142 and the top surface of the second rail base 140. The read/write head 170 is mounted on or with the second rail 142.

The top surfaces of the first and second rails 122 and 142 function as air bearing surfaces (ABSs), respectively, and generate a lifting force for lifting the air bearing slider 100 by forming a positive pressure. In particular, some portions of the top surfaces of the first and second rail bases 120 and 140 exist in front of the ABSs, such that the stepped portions between the ABSs and the top surfaces of the first and second rail bases 120 and 140 are formed. Thus, a wedge effect is applied to air introduced to the ABSs of the slider 100 due to the stepped portions, and accordingly, a sufficient positive pressure can be generated.

A negative pressure cavity 130 defined by the first rail base 120 may be formed on the disk facing surface 111 of the slider body 110. The negative pressure cavity 130 produces a negative force for pulling the slider 100 toward the surface of the disk 10.

The positive pressure forming rail part may further include third and fourth rail bases 150 and 160 disposed behind the first rail base 120, and third and fourth rails 152 and 162 respectively formed on top surfaces of the third and fourth rail bases 150 and 160. The third and fourth rails 152 and 162 increase a positive pressure near the rear end portion of the slider body 110 on which the read/write head 170 is positioned.

The air ventilator 180 passes through the slider body 110 from the disk facing surface 111 to the rear surface 112 in an air flow direction and provides air ventilation. The air ventilator 180 may pass through the slider body 110 obliquely, i.e., in a sloping direction or at an angle. An inlet 181 of the air ventilator 180 may be disposed at a substantial central portion of the slider body 110. When the negative pressure cavity 130 is formed on the disk facing surface 111 of the slider body 110 as described above, the air ventilator 180 is formed in the negative pressure cavity 130.

A cross-section of the air ventilator 180 generally has a circular shape, but may have an oval or polygonal shape, and is not limited to a circular shape. The inlet 181 of the air ventilator 180 may have the same area as an outlet 182 of the air ventilator 180.

Further, a width $W_H$ of the air ventilator 180, that is, a diameter of the air ventilator 180 having a circular cross-section, may range from approximately 1/10 to 1/2 of a width $W_s$ of the slider body 110.

The air ventilator 180 described above discharges air introduced between the disk 10 and the slider body 110 and particles P contained in the air. Specifically, when the disk 10 rotates in direction D, air flows in direction A and the air is introduced or flows between the surface of the disk 10 and the slider body 110. Accordingly, as described above, the slider 100 is lifted up to a predetermined flying height H due to the positive pressure produced by the positive pressure forming rail part. In this state, the read/write head 170 mounted on the slider 100 reads or writes data to or from the surface of the disk 10.

In this process, part of the air introduced between the disk 10 and the slider body 110 is discharged toward the rear surface 112 of the slider body 110 through the air ventilator 180, and remaining part of the air is discharged toward the rear end portion of the slider body 110. At this time, since a great number of particles P contained in the air introduced between the disk 10 and the slider body 110 or attached to the surface of the disk 10 are discharged along with the air discharged through the air ventilator 180, the number of the particles P included in the air discharged toward the rear end portion of the slider body 110 is reduced considerably. Accordingly, a damage to the read/write head 170, and a scratch or thermal asperity (TA) on the surface of the disk 10 due to the particles P is minimized or prevented.

For at least the reasons discussed above, in order to discharge the particles P, it is desirable to discharge as much air as possible through the air ventilator 180. To this end, the air ventilator 180 according to the present invention is formed of a shape to increase the flow rate of the air discharged through the air ventilator 180 as described above. For example, the air ventilator 180 is formed obliquely, or at an angle. Particularly, when the air ventilator 180 is inclined at an angle of approximately 30 to 60° relative to the disk facing surface 111 of the slider body 110, the air flow rate can be maximized. This will be explained with reference to simulations later.

Figure 6:
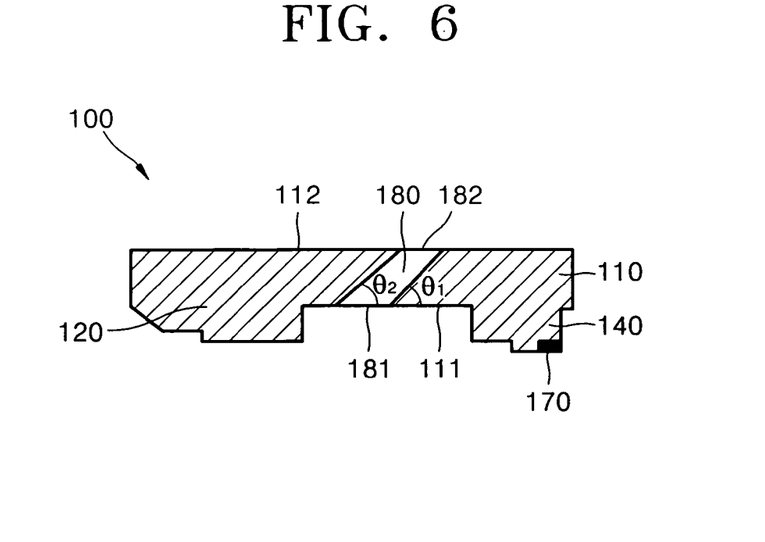
FIG. 6 is a vertical sectional view of a modified example of the air bearing slider shown in FIG. 5.

FIG. 6 is a vertical sectional view of a modified example of the air bearing slider shown in FIG. 5. Referring to FIG. 6, the air ventilator 180 passing through the slider body 110 may have a taper shape. That is, the inlet 181 of the air ventilator 180 may have an area different from that of the outlet 182. Specifically, an inclination angle $\theta_1$ of an inner surface of the air ventilator 180 at a rear end portion side of the slider body 110 may be greater or less than an inclination angle $\theta_2$ of another inner surface of the air ventilator 180 at a front end portion side of the slider body 110. In this instance, the flow rate of the air discharged through the air ventilator 180 increases as compared to the air ventilator 180 passing through the slider body 110 not having the taper shape.

In particular, when the inlet 181 of the air ventilator 180 has an area larger than that of the outlet 182 of the air ventilator 180, the flow rate of the air discharged through the air ventilator 180 increases further. This will be explained below in further detail.

Figure 7:
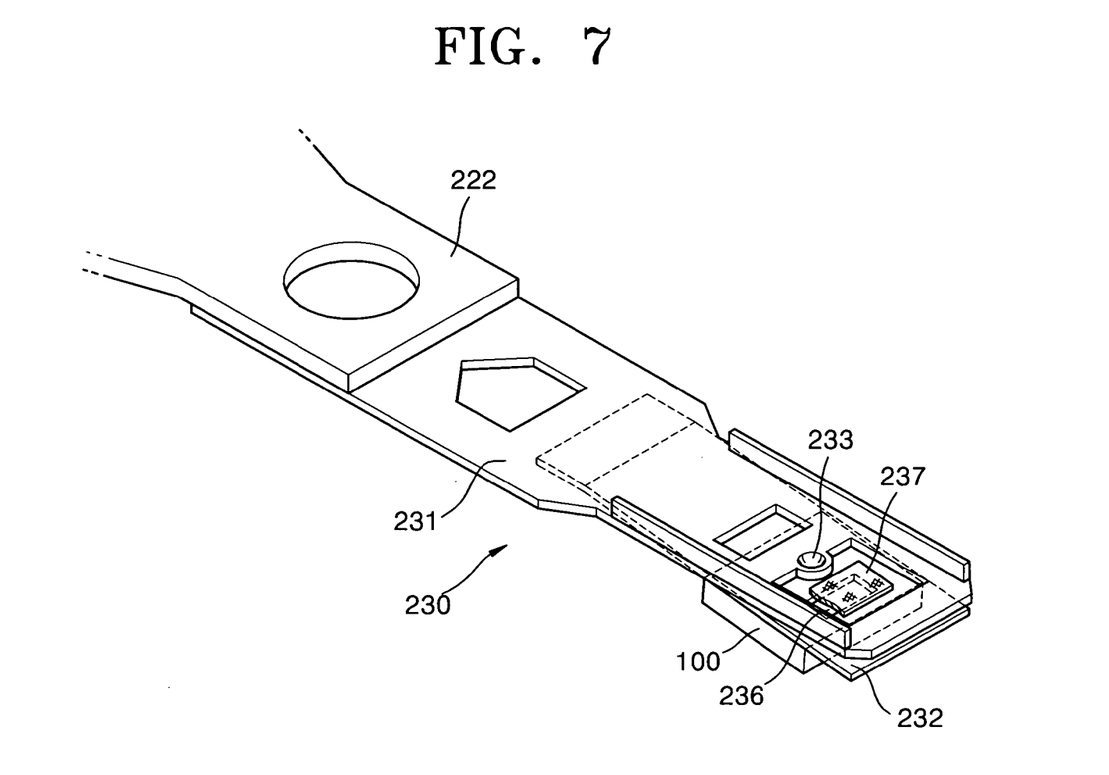
FIG. 7 is a perspective view of a suspension assembly including the air bearing slider shown in FIG. 4 and a filter according to an embodiment of the invention.
Figure 8:
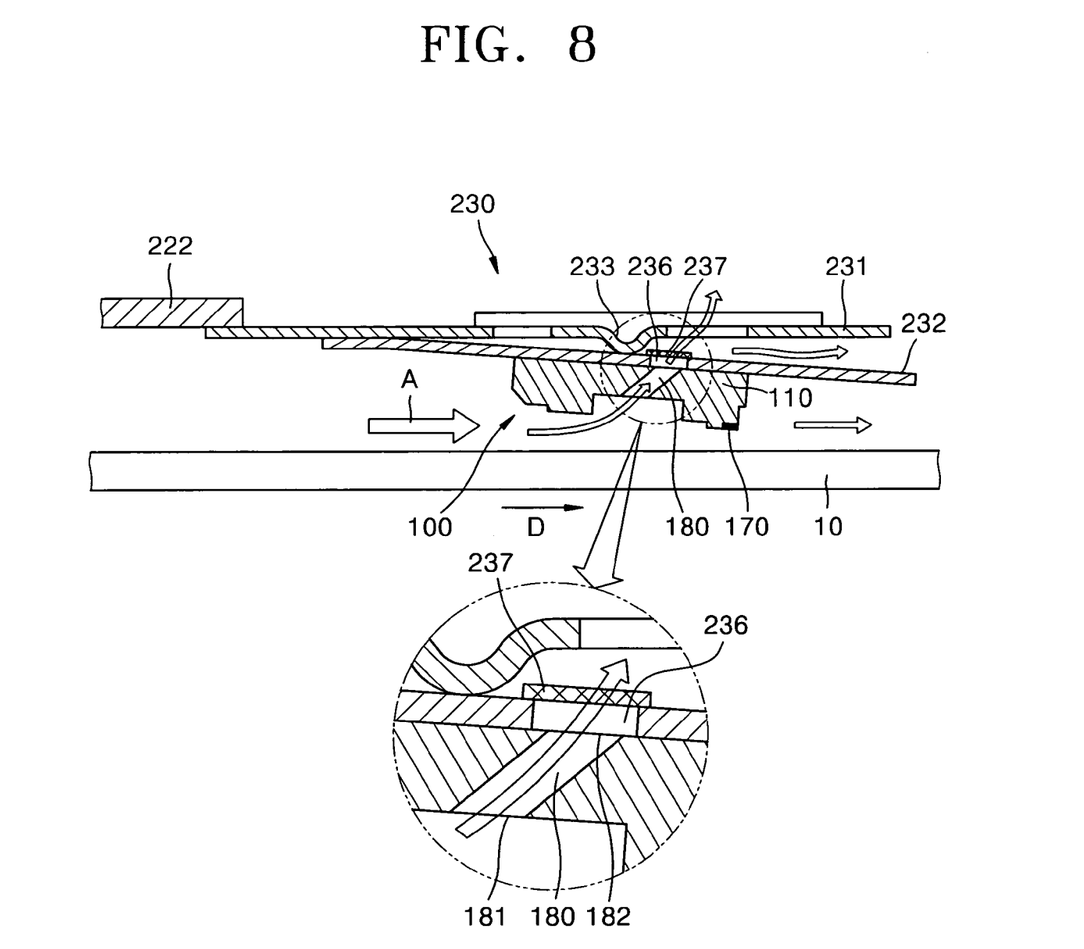
FIG. 8 is a vertical sectional view of the suspension assembly shown in FIG. 7.
Figure 9A:
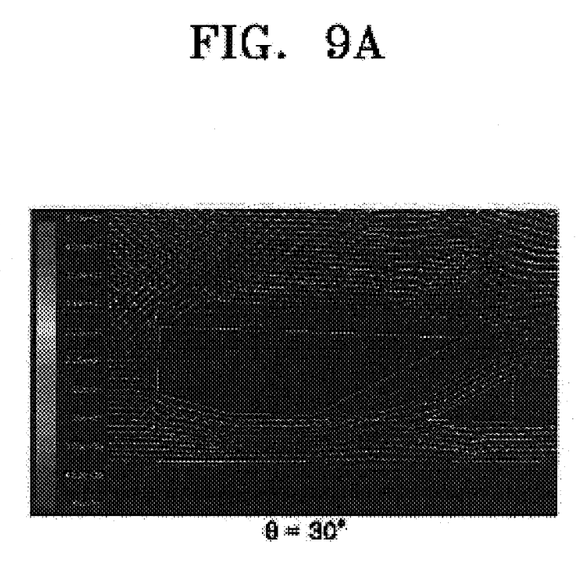
FIGS. 9A through 9F are diagrams illustrating flow simulations of air discharged through an air ventilation of the air bearing slider shown in FIG. 5.
Figure 9B:
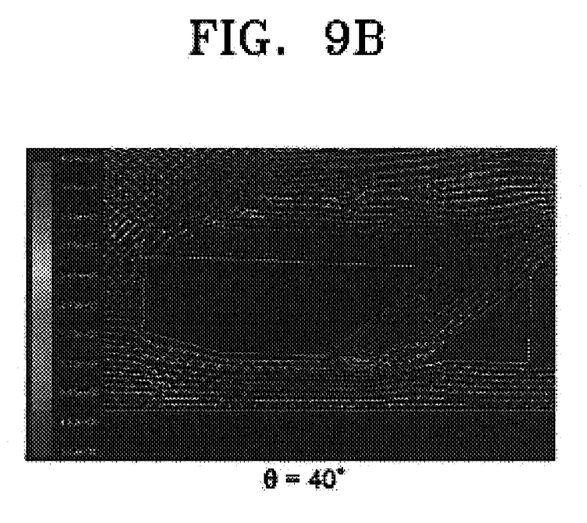
Figure 9C:
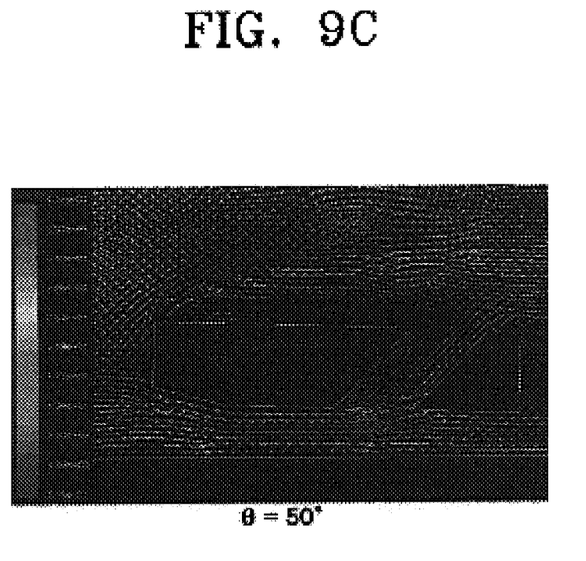
Figure 9D:
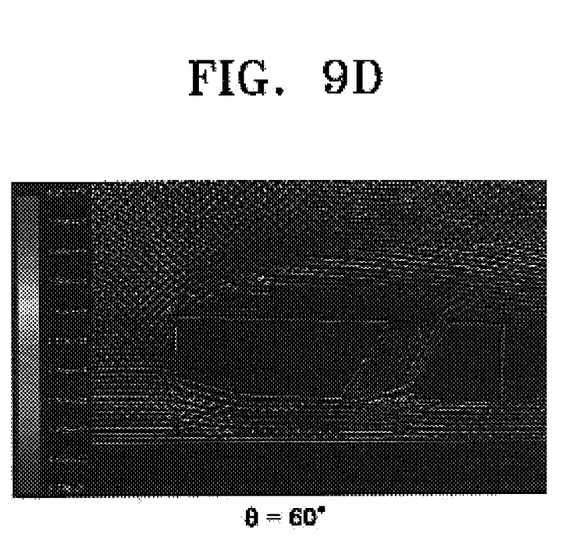
Figure 9E:
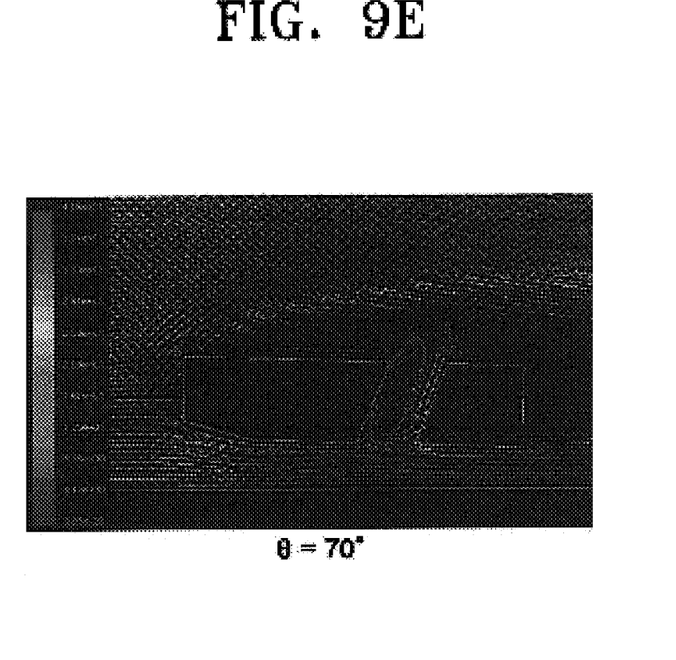
Figure 9F:
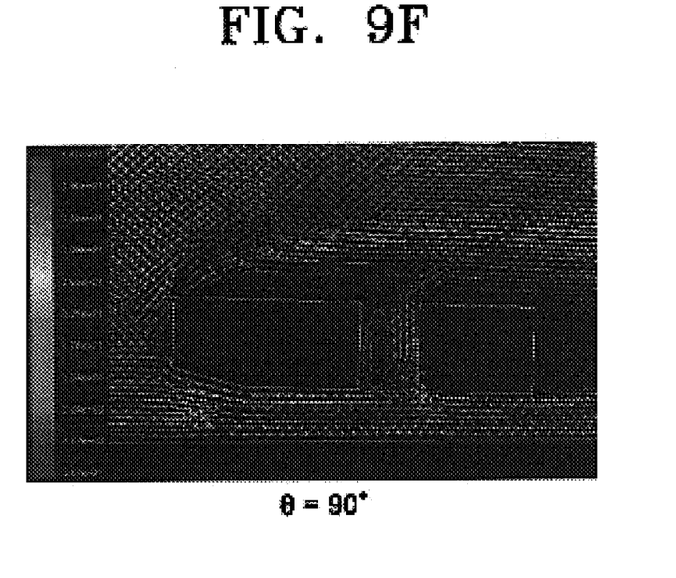

FIG. 7 is a perspective view of a suspension assembly including the air bearing slider shown in FIG. 4 and a filter according to an aspect of the invention. FIG. 8 is a vertical sectional view of the suspension assembly shown in FIG. 7.

Referring to FIGS. 7 and 8, a suspension assembly 230 of an actuator for a disk drive elastically biases the read/write head 170 toward the surface of the disk 10. The suspension assembly 230 includes a load beam 231, a flexure 232, and the air bearing slider 100 on which the read/write head 170 is mounted.

The load beam 231 is coupled to an end portion of a swing arm 222 of the actuator, and is manufactured typically by pressing a metal plate, such as a stainless steel sheet with a relatively low thickness, e.g., a thickness of approximately 0.05 mm.

The flexure 232 supports the air bearing slider 100, and is attached with a bottom surface of the load beam 231, that is, a surface facing the disk 10. One end portion of the flexure 232 is fixed with the bottom surface of the load beam 231 by welding or the like, and the other end portion of the flexure 232 extends along an end portion of the load beam 231 to move freely. The flexure 232 is made of a thin stainless steel sheet like the load beam 231. However, the flexure 232 has a thickness of approximately 0.02 mm, lower than that of the load beam 231, so that the slider 100 attached to the flexure 232 can roll and pitch freely.

A dimple 233 is formed on the load beam 231 in such a manner as to protrude toward the flexure 232. A predetermined elastic force is provided to the flexure 232 due to the dimple 233. In the above structure, the flexure 232 can move freely, and accordingly, the slider 100 attached to the flexure 232 can roll and pitch smoothly.

The air bearing slider 100 is attached with a disk facing surface of the flexure 232, and is constructed as described above. That is, the air bearing slider 100 includes the slider body 110, the positive pressure forming rail part, and the air ventilator 180 that passes obliquely through the slider body 110 in the air flow direction. The air ventilator 180 may have a shape depicted in FIG. 5 or 6.

According to the invention, a hole 236 is formed in the flexure 232 to communicate with the air ventilator 180. A filter 237 is installed over the hole 236 to filter particles contained in air discharged through the air ventilator 180.

It is preferable that the hole 236 has an area larger than that of the outlet 182 of the air ventilator 180 so that air passing through the air ventilator 180 can be discharged easily. The hole 236 may have a rectangular shape as shown in FIG. 7, but the shape of the hole 236 is not limited to any particular shape. For example, the hole 236 may have a circular shape corresponding to the cross-sectional shape of the air ventilator 180.

Edges of the filter 237 may be attached around a perimeter of the hole 236 so as to completely cover the hole 236. The filter 237 may be a membrane filter having a thickness less than a distance between the flexure 232 and the load beam 231 so that the filter 237 can be installed between the flexure 232 and the load beam 231.

According to the suspension assembly 230 as described above, since the filter 237 is installed on the flexure 232, particles contained in air discharged through the air ventilator 180 formed in the air bearing slider 100 are filtered effectively.

FIGS. 9A through 9F are diagrams illustrating flow simulations of air discharged through the air ventilator of the air bearing slider shown in FIG. 5. In the flow simulations, a diameter of the air ventilator was set to 0.2 mm and an inclination angle θ of the air ventilator was set to 30, 40, 50, 60, 70, or 90°.

In Table 1, a mass flow rate (MFR) is the amount of air discharged through the air ventilator 180, which is measured in the simulations, and N is a ratio of an MFR at each inclination angle θ of 30, 40, 50, 60, 70, or 90° to an MFR at an inclination angle θ of 90°.

TABLE 1

| Inclination Angle | θ = 30° | θ = 40° | θ = 50° | θ = 60° | θ = 70° | θ = 90° |
|---|---|---|---|---|---|---|
| MFR | 0.063219 | 0.017876 | 0.0083 | 0.010572 | 1.973104 | 0.004692 |
| N | 13.47515 | 3.810362 | 1.769038 | 2.253411 | 420.567 | 1.0 |

TABLE 2

| Inclination Angle | $\theta_1 = 50°, \theta_2 = 47°$ | $\theta_1 = 50°, \theta_2 = 53°$ |
|---|---|---|
| MFR(kg/sec) | 0.010359 | 0.008331 |
| N | 1.248151 | 1.003758 |

Figure 10A:
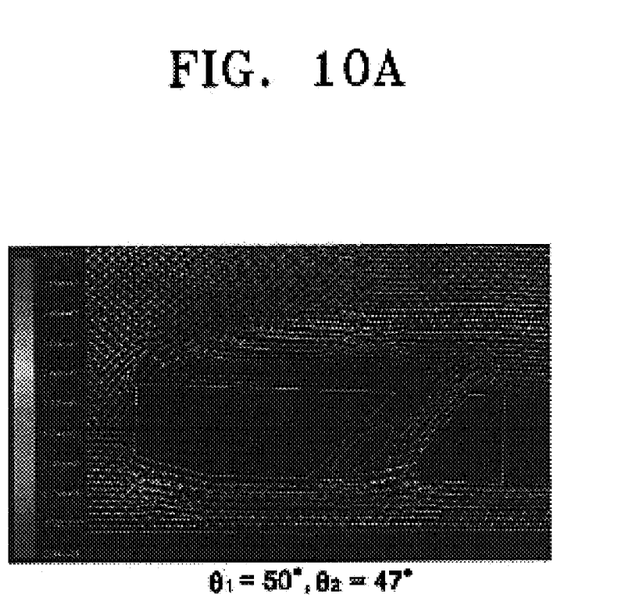
FIGS. 10A to 10B are diagrams illustrating flow simulations of air discharged through an air ventilation of the air bearing slider shown in FIG. 6.
Figure 10B:
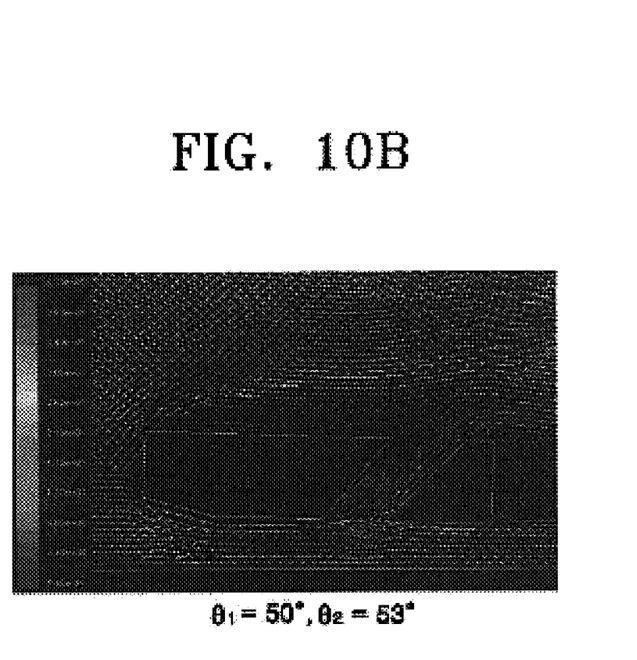

Referring to FIGS. 10A and 10B, when the air ventilator 180 has a taper shape, that is, when the inlet of the air ventilator 180 has an area different from that of the outlet of the air ventilator 180, the MFR increases more than when the inlet and outlet of the air ventilator 180 have the same area. Particularly, when the inclination angle $\theta_1$ of the air ventilator 180 is greater than the inclination angle $\theta_2$ of the air ventilator 180, the MFR of the air discharged through the air ventilator 180 is greater than when the inclination angle $\theta_1$ is less than the inclination angle $\theta_2$. Accordingly, it is preferable in view of the simulations that the outlet of the air ventilator 180 has an area smaller than that of the inlet of the air ventilator 180.

As described above, according to the air bearing slider for the disk drive of the invention, since particles introduced between the surface of the disk and the air bearing slider are discharged along with air to the outside of the air bearing slider through the air ventilator 180 formed in the air bearing slider, a scratch or TA on the surface of the disk and a damage to the read/write head due to the particles can be minimized. Also, since the air ventilator 180 is inclined, the MFR is maximized and efficiency in discharging particles can be improved.

Particles included in air discharged through the air ventilator 180 filtered effectively using the filter installed on the flexure of the suspension assembly.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An air bearing slider for a disk drive, the air bearing slider has a read/write head mounted thereon and is lifted from a surface of a disk due to a lifting force generated by disk rotation, the air bearing slider comprising:
    a slider body having a disk facing surface facing the surface of the disk and a rear surface opposite to the disk facing surface;
    a positive pressure forming rail part protruding from the disk facing surface of the slider body and generating a positive pressure for lifting the slider body from the surface of the disk; and
    an air ventilator passing obliquely through the slider body from the disk facing surface to the rear surface in an air flow direction and discharging air introduced between the disk and the slider body and particles included in the air.

2. The air bearing slider of claim 1, wherein a negative pressure cavity is provided on the disk facing surface of the slider body and the air ventilator is positioned inside the negative pressure cavity.

3. The air bearing slider of claim 1, wherein a cross-section of the air ventilator has a circular, oval, or polygonal shape.

4. The air bearing slider of claim 1, wherein an inclination angle of the air ventilator relative to the disk facing surface of the slider body ranges from approximately 30 to 60°.

5. The air bearing slider of claim 1, wherein an inlet and an outlet of the air ventilator have areas different from each other.

6. The air bearing slider of claim 1, wherein an inlet of the air ventilator has an area larger than an area of an outlet of the air ventilator.

7. The air bearing slider of claim 1, wherein a width of the air ventilator is equal to approximately 1/10 to 1/2 of a width of the slider body.

8. The air bearing slider of claim 1, wherein a filter is provided on the rear surface of the slider body to filter the particles included in the air discharged through the air ventilator.

9. The air bearing slider of claim 8, wherein the filter is a membrane type filter.

10. A suspension assembly of an actuator for a disk drive, which elastically biases a read/write head toward a surface of a disk, the suspension assembly comprising:
    a load beam coupled to an end portion of a swing arm of the actuator;
    a flexure having one end portion fixed to a disk facing surface of the load beam and the other end portion extending along an end portion of the load beam; and
    an air bearing slider attached with a disk facing surface of the flexure, having the read/write head mounted thereon, and lifts from the surface of the disk due to a lifting force generated by the rotation of the disk, the air bearing slider comprising:
        a slider body having a disk facing surface and a rear surface opposite to the disk facing surface;
        a positive pressure generating rail part protruding from the disk facing surface of the slider body and generating a positive pressure for lifting the slider body from the surface of the disk; and
        an air ventilator passing obliquely through the slider body from the disk facing surface to the rear surface in an air flow direction and discharging air introduced between the disk and the slider body and particles contained in the air.

11. The suspension assembly of claim 10, wherein a hole is provided in the flexure to correspond with the air ventilator, and a filter is installed over the hole to filter the particles included in the air discharged through the air ventilator.

12. The suspension assembly of claim 11, wherein the hole has an area larger than an area of an outlet of the air ventilator.

13. The suspension assembly of claim 11, wherein edges of the filter are attached around a periphery of the hole provided in the flexure to cover the hole.

14. The suspension assembly of claim 11, wherein the filter is a membrane filter with a thickness less than a distance between the flexure and the load beam.

15. The suspension assembly of claim 10, wherein a negative pressure cavity is provided on the disk facing surface of the slider body, and the air ventilator is positioned inside the negative pressure cavity.

16. The suspension assembly of claim 10, wherein a cross-section of the air ventilator has a circular, oval, or polynomial shape.

17. The suspension assembly of claim 10, wherein an inclination angle of the air ventilator relative to the disk facing surface of the slider body ranges from approximately 30°to 60°.

18. The suspension assembly of claim 10, wherein an area of an inlet of the air ventilator is different than an area of an outlet of the air ventilator.

19. The suspension assembly of claim 10, wherein an inlet of the air ventilator has an area larger than that of an area of an outlet of the air ventilator.

20. The suspension assembly of claim 10, wherein a width of the air ventilator is equal to 1/10 to 1/2 of a width of the slider body.

21. A disk drive that generates a force to lift a slider a predetermined distance from a surface of a medium, comprising:
    a medium facing surface and a surface opposite the medium facing surface of the slider functioning as air bearing surfaces, respectively generating the lift force for lifting the slider by forming a positive pressure between the slider and the medium,
    an air ventilator obliquely passing through the slider from the medium facing surface of the slider to the surface opposite the medium facing surface in an air flow direction,
    wherein the air ventilator discharges air introduced between the medium and the slider.

22. The disk drive as claimed in claim 21, wherein the slider comprises:

a positive pressure forming portion to produce a positive pressure for lifting the slider; and a negative pressure forming portion to produce a negative force for pulling the slider toward the surface of the medium, wherein the inclination angle of the air ventilator relating to the medium facing surface of the slider and the negative pressure forming portion ranges from approximately 30° to 60°.

23. The disk drive as claimed in claim 21, wherein an inlet of the air ventilator has the same area as an outlet of the air ventilator.

24. The disk drive as claimed in claim 21, wherein the air ventilator has a taper shape such that an inlet area of the air ventilator is different than an outlet area of the air ventilator in order to affect a mass flow rate of air discharged through the air ventilator.

25. The disk drive as claimed in claim 21, further comprising a filter provided near an outlet of the air ventilator to filter particles in air discharged through the air ventilator.

26. The disk drive as claimed in claim 25, wherein the filter is a membrane filter.

27. The disk drive as claimed in claim 21, wherein the width of the air ventilator ranges from approximately $1/10$ to $1/2$ of a width of the slider.

28. The disk drive as claimed in claim 21, wherein an inlet of the air ventilator is provided at a substantial center portion of the medium facing surface of the slider.

29. The disk drive as claimed in claim 21, wherein a cross section of the air ventilator is circular-shaped.

* * * * *

UNITED STATES PATENT AND TRADEMARK OFFICE
CERTIFICATE OF CORRECTION

PATENT NO. : 7,394,623 B2
APPLICATION NO. : 11/066271
DATED : July 1, 2008
INVENTOR(S) : Seung-hyun Song Page 1 of 1

It is certified that error appears in the above-identified patent and that said Letters Patent is hereby corrected as shown below:

Column 9, Line 46, change "30" to --30°--.

Signed and Sealed this

Twenty-first Day of October, 2008

JON W. DUDAS
*Director of the United States Patent and Trademark Office*